United States Patent [19]

Welch

[11] Patent Number: 4,623,919

[45] Date of Patent: Nov. 18, 1986

[54] METHOD AND SYSTEM FOR CONTROLLING ACCESS TO TRANSMITTED MODULATED ELECTROMAGNETIC WAVE CARRIED INFORMATION

[76] Inventor: James D. Welch, 10328 Pinehurst Ave., Omaha, Nebr. 68124

[21] Appl. No.: 522,459

[22] Filed: Aug. 11, 1983

[51] Int. Cl.⁴ .......................................... H04N 7/167
[52] U.S. Cl. .................................... 358/118; 358/121
[58] Field of Search .............. 358/114, 115, 118, 122, 358/123, 121; 179/1.5 M; 340/825.31, 825.34

[56] References Cited

U.S. PATENT DOCUMENTS

| | | |
|---|---|---|
| 2,478,023 | 3/1946 | Summerhayes, Jr. . |
| 2,871,349 | 1/1959 | Shapiro . |
| 2,901,604 | 8/1959 | Nordstrom et al. . |
| 3,204,190 | 8/1965 | Broadhead, Jr. . |
| 3,235,811 | 2/1966 | Steiger . |
| 3,347,982 | 10/1967 | Bass et al. ............................ 358/118 |
| 3,586,986 | 6/1971 | Deurne-Zuid . |
| 3,736,368 | 5/1973 | Vogelman et al. .................. 358/115 |
| 3,943,382 | 3/1976 | Hermansdorfer et al. . |
| 4,012,583 | 3/1977 | Kramer ............................. 358/115 X |
| 4,081,832 | 3/1978 | Sherman .......................... 358/121 X |
| 4,099,203 | 7/1978 | Garodnick et al. ................. 358/118 |
| 4,454,543 | 6/1984 | Lund et al. ......................... 358/118 |
| 4,494,143 | 1/1985 | Lovick et al. ....................... 358/122 |
| 4,517,595 | 5/1985 | Tobita ................................. 358/114 |

Primary Examiner—Stephen C. Buczinski
Assistant Examiner—Linda J. Wallace
Attorney, Agent, or Firm—James D. Welch

[57] ABSTRACT

A method and system for making possible enforceable subscription available electromagnetically transmitted communications. Mailable receiver tuning components are described which serve to make receivers operable in the presence of a control signal, said signal being comodulated with an information signal.

3 Claims, 3 Drawing Figures

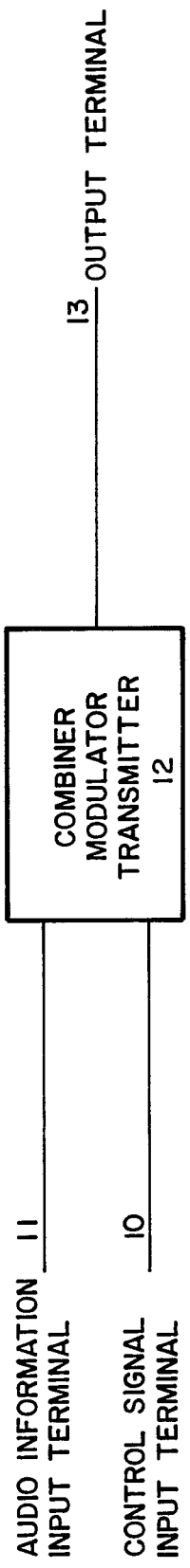
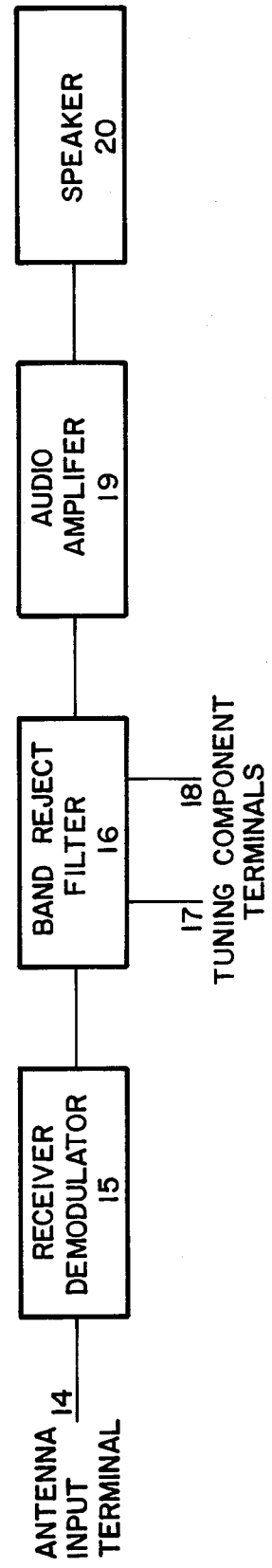

METHOD AND SYSTEM FOR CONTROLLING ACCESS TO TRANSMITTED MODULATED ELECTROMAGNETIC WAVE CARRIED INFORMATION

TECHNICAL FIELD

This invention relates to modulated electromagnetic wave information transmission and, more particularly, to a method and system for enabling or preventing access thereto by fee-paying, or otherwise proper, subscribers, but not to others, respectively.

BACKGROUND ART

The literature is rich in data pertaining to circuitry which can be utilized in the method and system herein presented, such as band reject, band pass and low pass filters, frequency controlled switches, and signal combiners. There is no attempt herein to claim specific circuitry, but rather the claim is to a new use for such circuitry to provide a system and method for enabling the fee-enforceable operation of subscription available electromagnetically transmitted modulated information communication via specially equipped transmitters and receivers.

Equipment with which a typical 1800 Hz (100 Hz bandwidth) tone can be combined with the voice frequency signal for transmission over FM-SCA facilities, and which provides receivers with trimmable band reject capability, is available in the market and utilizes circuitry of a type readily available in the industry. The available equipment does not, however, profor the use of widely variable control signal frequencies nor for the use of user changeable, easily mailable receiver tuning components. The improvement herein provides for such enforcement enhancing attributes. The inventor knows of no prior art which performs or obviates the performance of the function herein claimed.

Other available systems utilize receiver specific control coded signals to turn on or off receivers equipped with proper decoding circuitry; however, such systems cannot effect the operation of home-built receivers which do not include the decoder control circuitry, hence, are not well suited to enforceable access control.

DISCLOSURE OF THE INVENTION

A system and method of controlling access to information transmitted via modulated electromagnetic waves is achieved by circuitry which provides for including a stable control frequency in a modulated carrier wave such that it appears as though it were originally a part of the information signal which is modulated onto the carrier wave in an identical manner. The composite "information-control" waveform which results from demodulation by circuitry in the receivers is processed by circuitry in the receivers which follows the demodulator but precedes the audio amplifier and which provides for allowing uneffected access to the information if it is properly adjusted by a replaceable component available only upon payment of a fee, or other transmission facility authority criteria.

Two embodiments of the system and method are included, of which the first is preferred, and which involves the injection of an audio band control signal onto a carrier wave such that it will produce a loud screech in a receiver which is not equipped with a properly tuned band reject filter, placed ahead of the receiver audio amplifier circuitry. The filter will serve to prevent the control signal passage to such circuitry. The control freqency will preferably occupy the frequency spectrum at the high end of the audio band (e.g. above 1000 Hz) and the band reject filter will be such as to provide large attenuation at the control signal frequency but also provide rapid roll off so as not to interfere with the remainder of the audio band frequencies. The circuitry which processes the control signal at transmitters and receivers will allow for change of that frequency at subscription period intervals so that failure to pay a fee will result in an inability of the receiver to reject a new control signal frequency.

The second embodiment involves use of a control signal of a frequency outside and above the audio band, but which is modulated onto the carrier wave in a similar fashion to that described for the first version. The receiver will have circuitry which will provide for preventing the control signal access to the audio amplification circuitry but which will direct the information signal into the same (e.g., a low pass filter with a cut off at about 5 KHz). The control signal will be directed, by circuitry providing for such (e.g., a band pass filter tuned to the control frequency), into an operability activating module. The control signal, hence, will determine the receiver operability. Again, the control signal frequency will be adjustable and a new receiver tuning component will be issued each subscription period which will be available only upon payment of a fee, or other transmission facility authority criteria being met.

A typical use will be in FM-SCA subcarrier transmission of specialty information where funding is accomplished through periodic user payments. Non-paying persons, not having access to current tuning components which connect to special transmission authority supplied receivers, will obtain adversely effected output. Similar capability would be available to any electromagnetic wave transmission operation, such as in police radio communications, or in walki-talki applications.

The receiver tuning components are to be low cost resistors, capacitors, and inductors, or combinations of such in a package which is easily mailed to paying, or otherwise proper, subscribers as a result of their small size. Such components will be equally easy to return to transmission authorities if desired. For instance, it would be possible to require the return of a first period component prior to being allowed to receive a third period component, the second period component being supplied without a return requirement to allow continuity of service.

It is also possible to achieve a similar result by building a network of tuning components into the receivers which are connectable via switches; a connection guide being available to proper subscribers only. A shortcoming of this approach, however, is that a persistent methodical person could eventually discover the code.

Without actual knowledge of the system and method claimed here-in, and a fair degree of electronic expertise, it would be extremely difficult for most persons to obtain utilizable access to transmissions sent in compliance with the system and method and, as a result, subscription funding of access is made enforceable.

An object of the present invention is to provide a system and method of making enforceable subscription supported electromagnetic wave transmitted information communication where non-authorized persons are to be denied undegraded access.

A further object is to provide a system and method to limit access to restricted transmissions such as police communications or walki-talki comunications.

Another object of the present invention is to achieve simple, economical user access control requiring minimal change to existing systems equipment.

BRIEF DESCRIPTION OF THE DRAWINGS

FIG. 1 is a diagram of the transmitter for both embodiments of the invention;

FIG. 2 is a diagram of the receiver for the preferred embodiment of the recent invention;

BEST MODES FOR CARRYING OUT THE INVENTION

Figure 3:
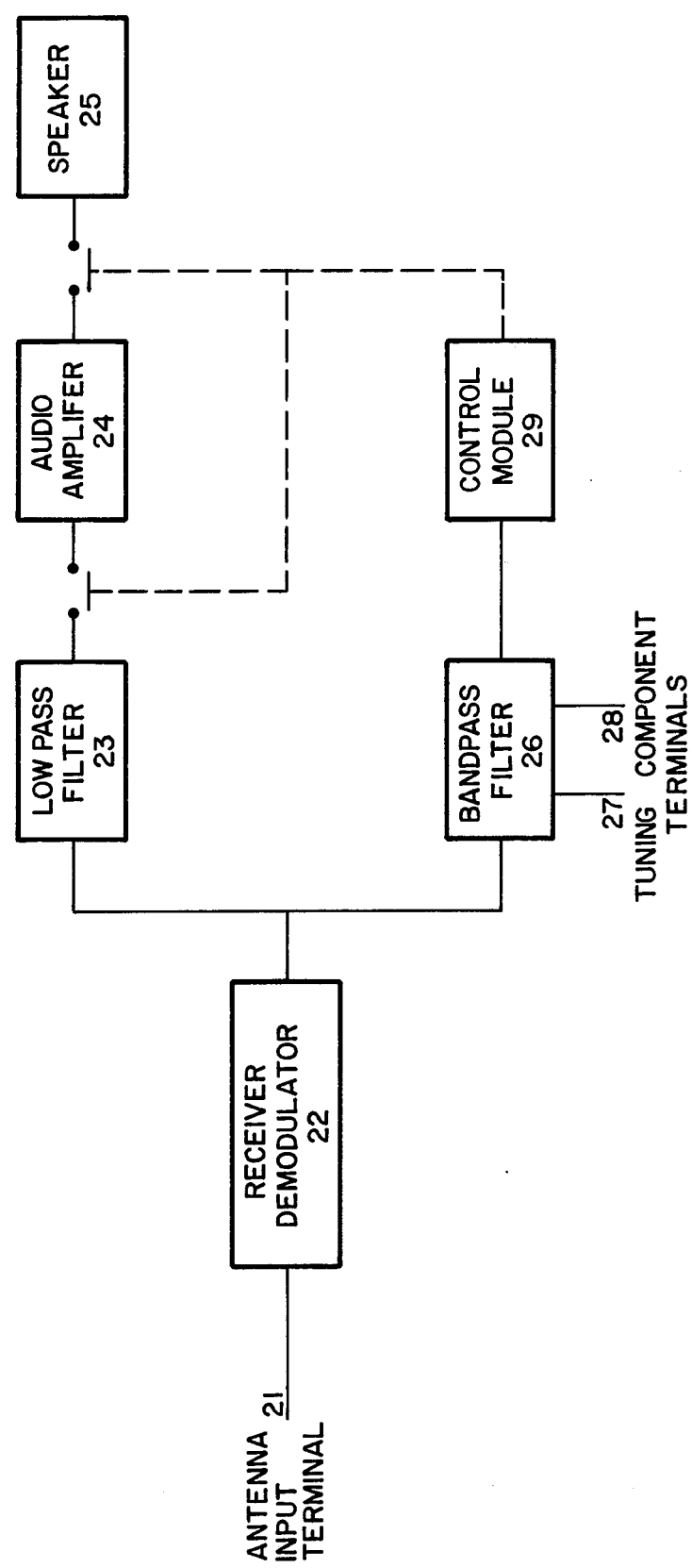
FIG. 3 is a diagram of the receiver for the alternate embodiment of the recent invention.

The preferred embodiment involves a system and method for transmitting modulated information in combination with an audio control frequency such that the resultant appears as if the control frequency was initially a part of the information frequency spectrum, over, for instance, the SCA facilities of FM stations.

Referring now to FIG. 1, audio information input terminal (11) and control signal input terminal (10) serve to allow related signals access to combiner modulator transmitter (12), and output terminal (13) provides access to the wave form signal, which is caused to be transmitted to receivers, via electromagnetic waves.

The receivers in the preferred approach are equipped with special circuitry to use the control signal to prevent or allow some access to the audio amplification circuitry. In FIG. 2 a terminal (14) for connection to an antenna is shown at the input to a receiver demodulation circuit (15). Terminal (14) serves to allow the transmitted modulated signal access to the demodulator which in turn provides a demodulated signal containing the information and control signal to a band reject filter (16). Terminals (17) and (18) are connected to the band reject filter (16). A tuning component can be connected to terminals (17) and (18) with the result that the control frequency can be blocked. If the proper tuning component is present, the control frequency will be prevented from entering the audio amplifier circuitry (19) and speaker (20), also well known means (not shown) for trimmer adjustment will be provided. If a proper tuning component is not present and connected to terminals (17) and (18), the control signal will enter the audio amplifier circuitry (19) and cause the information to be masked. The tuning component can be a resistor, capacitor, inductor or a combination of such items in a package and will be available to fee paying subscribers, or otherwise proper recipients on a subscription period basis. The tuning component will be conveniently mailed to customers, easily mountable on the receiver by plug or other arrangement, and returned to the transmission authority by mail. The control signal will be changed each subscription period and a new tuning component will be provided to those who qualify to receive the information. Also, instructions for trimming will be supplied in an easily understandable form allowing subscribers to optimize signal reception in an easily executable way.

In the preferred embodiment, the control signal is preferably, but not limited to, the frequency range in the audio band above 1000 Hz. The band reject filter (16) will provide for high attenuation of the control signal frequency, as well as steep roll off, so as to create a narrow but effective guard band to prevent interference with other audio band information frequencies when the proper tuning component is present.

The embodiment of FIG. 3 is limited in its application to receivers with special receiver control modules and, as a result, will not prevent listenable access by persons who build their own receivers. However, some persons who have good high frequency hearing will be bothered by the control signal which would be a high frequency, above the typical audio band, and will be present in home built receiver outputs. As in the preferred embodiment, the information and control signals are combined and modulated as described with relation to FIG. 1.

FIG. 3 shows a terminal (21) to which a lead from an antenna is connected providing the transmitted modulated signal to the receiver demodulator circuitry (22), which in turn provides a demodulated information control signal to a low pass filter (23) and a band pass filter (26). The low pass filter (23) will serve to direct the audio signal to the audio amplifier circuitry (24) while preventing such access to the higher control frequency. The band pass filter (26) is shown with terminals (27) and (28) to which must be connected a proper tuning component similar to that described with respect to the first embodiment. Trimmer adjustment (not shown) will also be provided. If a proper tuning component is so attached and the trimmer properly adjusted, the control signal will have access to the control module (i.e. circuitry for controlling the receiver operability) (29), which may be a relay circuit. The action of the control module (29), as a result of obtaining the signal, will serve to render the receiver operable. As in the first embodiment, the tuning component will be available only to paying, or otherwise proper, information recipients.

Having hereby disclosed the subject matter of this invention, it should be obvious that many modifications, substitutions, and variations of the present invention are possible in light of the above teachings. It is therefore to be understood that the invention may be practised other than as specifically described, and should be limited in breadth and scope only by the appended claims.

I claim:

1. A system for controlling access to electromagnetic wave communication transmissions, of the type including FM-SCA, which comprises a means for generating and injecting a continuously variable audio frequency control signal into an audio frequency information signal at the transmitter in a fashion such that the resultant modulated transmitted wave is identical to the wave which would result if the audio frequency control signal were originally a part of the audio frequency information signal; and means for tuning a filter in the receiving equipment so that the audio frequency control signal does not effect the processing of the audio frequency information signal by the receiver.

2. The system of controlling access to electromagnetic wave communication transmissions, as in claim 1, wherein the means for tuning the filter in the receiving equipment comprises a plug-in resistor, capacitor, inductor, or combination of same, and a screwdriver adjustible trimmer.

3. A method of controlling access to FM-SCA electromagnetic wave communication transmissions comprising:

generating a variable audio frequency control signal;

injecting the variable audio frequency control signal into an audio frequency information signal such that the resulting waveform is identical to that which would result if the audio frequency control signal were originally a part of the audio frequency information signal;

transmitting the composit audio control and information signal over an FM-SCA transmission system;

providing receiver equipment which contains circuitry for blocking the audio frequency control signal, while passing the audio frequency information signal;

periodically changing the audio frequency control signal frequency at the transmitter, and tuning the circuitry in the receiver so that the new audio frequency control signal does not mask the audio frequency information signal.

* * * * *